(12) United States Patent
Kieboom et al.

(10) Patent No.: US 11,587,022 B2
(45) Date of Patent: Feb. 21, 2023

(54) SYSTEM AND METHOD FOR MANAGING RETAIL PRODUCT RETURNS

(71) Applicant: Pollen Technologies Inc., Marietta, GA (US)

(72) Inventors: Spencer Kieboom, Marietta, GA (US); Mark Hart, Oak Ridge, NC (US); Robert Brodersen, Palm Harbor, FL (US); Richard Lucas, Venice, CA (US); Sawyer Billings, Venice, CA (US)

(73) Assignee: POLLEN TECHNOLOGIES INC., Marietta, GA (US)

( * ) Notice: Subject to any disclaimer, the term of this patent is extended or adjusted under 35 U.S.C. 154(b) by 223 days.

(21) Appl. No.: 17/096,116

(22) Filed: Nov. 12, 2020

(65) Prior Publication Data

US 2022/0147927 A1    May 12, 2022

(51) Int. Cl.
*G06Q 10/0837* (2023.01)
*G06K 7/14* (2006.01)
*H04W 4/02* (2018.01)
*G06Q 10/0834* (2023.01)

(52) U.S. Cl.
CPC ....... *G06Q 10/0837* (2013.01); *G06K 7/1417* (2013.01); *G06Q 10/0834* (2013.01); *H04W 4/023* (2013.01)

(58) Field of Classification Search
CPC .......... G06Q 10/0837; G06Q 10/0834; G06K 7/1417; H04W 4/023

USPC ........................................................ 705/340
See application file for complete search history.

(56) References Cited

U.S. PATENT DOCUMENTS

| | | | | |
|---|---|---|---|---|
| 2006/0149577 A1* | 7/2006 | Stashluk, Jr. | ........ | G06Q 30/016 705/13 |
| 2016/0364688 A1* | 12/2016 | Vakneen | ............ | G06Q 10/0833 |
| 2021/0312216 A1* | 10/2021 | De Gouveia | ...... | G06Q 10/0833 |
| 2021/0383319 A1* | 12/2021 | Brow | ................ | G06K 19/06028 |

OTHER PUBLICATIONS

"An analysis of single item inventory systems with returns" Published by Cornell University (Year: 1981).*

* cited by examiner

*Primary Examiner* — Zeina Elchanti
(74) *Attorney, Agent, or Firm* — Cowan, Liebowitz & Latman, P.C.; Mark Montague; Daniel Basov

(57) ABSTRACT

The present application generally relates to methods and systems for facilitating the return and exchange processes of unwanted retail products, and it more specifically relates to coordinating the pickup, drop-off, and delivery of unwanted products from the customer to the retailer. The methods and systems of the present application being designed to facilitate the product return and exchange processes without the need for the customer's credit card or other payment information. The methods and systems of the present application being designed to facilitate earlier confirmation to the retailer that the product has been picked up from the customer.

18 Claims, 6 Drawing Sheets

SYSTEM AND METHOD FOR MANAGING RETAIL PRODUCT RETURNS

FIELD OF THE DISCLOSURE

The present disclosure generally relates to retail product return and exchange systems and methods. More particularly, the present disclosure relates to the management, pickup, and transport of products intended by the consumer to be returned to the retailer.

BACKGROUND

Product return and exchange systems are used by retailers in both electronic commerce ("e-commerce") and physical "brick and mortar" commerce.

Historically, retail return policy was that if a consumer buys a product the consumer then owns the product. Returns, if accepted, were exchanged for store credit and the amount was often reduced by a restocking fee of up to 20%. Later, return policies adapted to allow consumers the option of exchanging the product (e.g., for a different size or color) or receiving store credit for the full value of the product.

The introduction of the World Wide Web enabled a great shift in the economy and the boom of e-commerce. Presently, there are two typical retail product return options in e-commerce. One is offered by e-commerce retailers, wherein the consumer has the opportunity to exchange a product, receive a refund, or receive store credit. The consumer must then return the product by either shipping the product to a designated e-commerce retailer physical location or personally dropping the product off at a designated drop-off location, such as a "locker," or some other retail partner in partnership with the e-commerce retailer. If the consumer drops off a product elected to be exchanged at a designated e-commerce retailer physical location or at a retail partner, the retailer will only send the replacement once the retailer verifies that the product has been received. Product exchanges are not typically available if the product is dropped off at a "locker." The standard return process accrues a number of transaction fees from the credit card companies for the retailer. When a customer initiates a return there is a transaction fee, and if the consumer decides to rebuy the correct item there is an additional transaction fee.

The second typical retail product return and product exchange option is offered by third-party companies, where the third-party company purchases the replacement product for the consumer and the consumer is then responsible for sending the product they no longer desire to the retailer. The third-party return service is then refunded the fronted dollars and some change from the retailer when the consumer sends the item back. Up until that point the third-party return service is responsible for both items if nothing is returned.

Vying for retail business in today's extremely competitive market requires a virtual "no questions asked" return policy, and in the world of e-commerce this often includes offering return shipping at no cost to the consumer. In virtually all cases, the retailer accepts the return request and refunds the consumer the full purchase price. Often, the retailer will provide a prepaid return shipping label to cover the shipping cost of the return or, alternatively, ask the consumer to keep the item. Often, these returned items are unwanted by the retailer, but the retailer also does not want the returned items re-entering the marketplace as this would put returned items in competition with their new items. Acceptance of unwanted returned items results in extra cost to the retailer and a large amount of waste and attendant negative environmental impact.

Existing product return and/or exchange systems require consumers to ship or transport the unwanted product themselves and/or the third-party company requires the consumer or retailer to provide credit card information. Further, any damage caused to the product in shipping via a shipping service or postal service may be attributed to the consumer and triggers a time-consuming and costly process of either rejecting the return/exchange when the product is received by the retailer or potentially requiring the retailer to issue only a partial refund. This leads to confusion and lower consumer satisfaction.

A need exists in the retail industry for improved systems and methods that addresses the deficiencies of the existing retail product return and exchange systems while continuing to allow consumers to return unwanted products. The advantages of an improved retail product return system may include one or more of the following: reducing the cost of processing items being returned to retailers, earlier detection of quality issues with the product being returned, expediting the timeline for retailers to send exchange products, repurposing the unwanted items in a sustainable fashion, keeping these items out of a "secondary" market, and dramatically reducing the amount of waste resulting from returned product's disposal.

SUMMARY OF THE DISCLOSURE

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter.

A long-felt but unmet need exists for retail product return and exchange systems and methods that simplify and reduce the cost and waste of the return process for both the consumer and the retailer, while further addressing the other disadvantages of such existing systems.

According to the present invention, this object is achieved by providing a product return and exchange system and method whereby a consumer may initiate a return and/or exchange of an unwanted product via the retailer. One aspect of the product return and/or exchange system allows for the convenient coordination and facilitation of the pickup and delivery of the product from the consumer's front door to the retailer via a logistics partner (such as a commercial rideshare or delivery service). The system communicates details of the return/exchange through an application accessible via a computer or mobile device through a computer network (wired or wireless), such as the Internet. Embodiments of the present disclosure address one or more of the disadvantages and problems discussed above.

BRIEF DESCRIPTION OF THE DRAWINGS

The foregoing summary, as well as the following detailed description of the disclosure, is better understood when read in conjunction with the appended drawings. For the purpose of illustrating the disclosure, exemplary constructions of the inventions of the disclosure are shown in the drawings. However, the disclosure and the inventions herein are not limited to the specific methods and instrumentalities disclosed herein.

DETAILED DESCRIPTION

Figure 1:
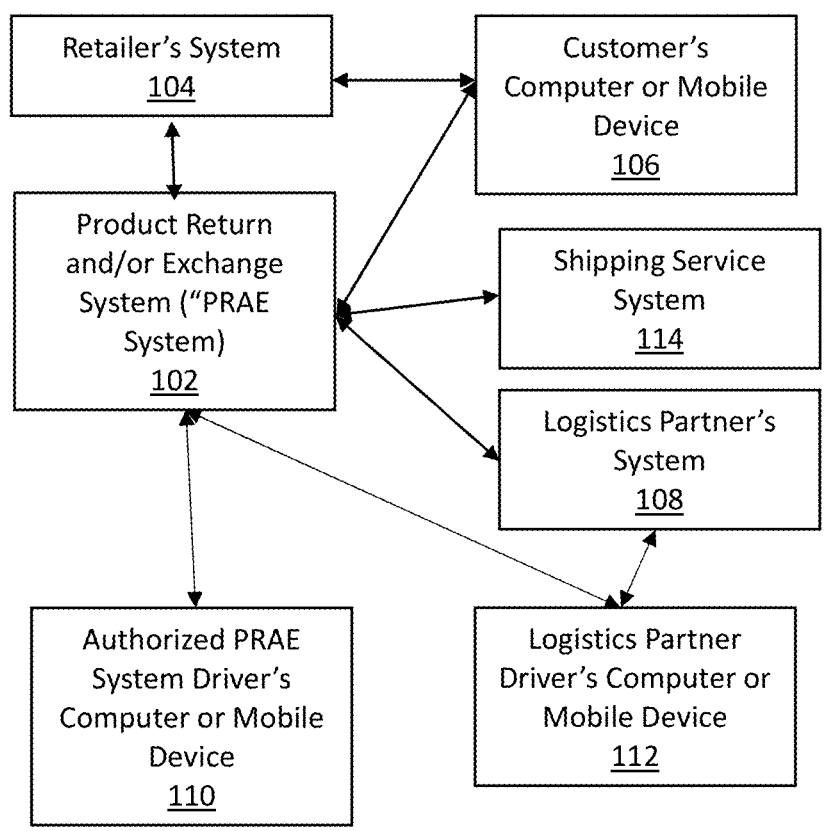
FIG. 1 is a block diagram illustrating the flow of communication in a representative embodiment of the invention for facilitating the management, pickup and delivery of products intended to be returned and/or exchanged by the customer.

This disclosure as a whole may be best understood by reference to the following detailed description when read in conjunction with the accompanying drawings, drawing descriptions, abstract, background, field of the disclosure, and associated headings. Identical reference numerals when found on different figures identify the same elements or a functionally equivalent element. The elements listed in the abstract are not referenced but nevertheless refer by association to the elements of the detailed description and associated disclosure.

The Concept

The present disclosure provides a product return and exchange system ("PRAE System"). Embodiments of the present disclosure provide greater efficiency and cost and waste reduction via the pickup of unwanted products right from the customers' chosen address. In addition, embodiments provide for a more efficient and accurate exchange process by auditing the product prior to shipping and not requiring the collection of payment (such as credit card) information from the customer. Auditing the product prior to shipping allows the retailer to send the replacement product earlier in the process (i.e., immediately following driver confirmation at pickup rather than when the retailer receives the returned product). The PRAE System makes an exchange of products more organic (as if the customer had walked into a store to swap a shirt out because it was the wrong size). When a customer returns a product in this matter, the customer does not get charged again for the exchange. Rather, the vendor retains the returned item and recognizes the exchange leaving the store. This results in a number of benefits, including: reducing the cost of processing items being returned to retailers, reducing the transaction fees, earlier detection of quality issues with the product being returned, expediting the timeline for retailers sending exchange products, repurposing the unwanted items in a sustainable fashion, keeping these items out of a "secondary" market, and dramatically reducing the amount of waste resulting from returned product's disposal.

The System

In an embodiment, as shown in FIG. 1, the PRAE System 102 communicates through a computer network (wired or wireless), such as the Internet. The PRAE System 102 communicates with the retailer's system 104, the customer's computer or mobile device 106, the logistics partner's system 108, and the shipping service system 114 to facilitate the return of the unwanted product from the customer. The logistics partner 108 may include any available rideshare service (such as provided by Uber Technologies Inc. of San Francisco, Calif. or Lyft, Inc. of San Francisco, Calif.) or retail delivery service, including food delivery services (such as provided by DoorDash Inc. of San Francisco, Calif. or Grubhub Inc. of Chicago, Ill.). The shipping service 114 may include the U.S. Postal Service, or other shipping services such as UPS, FedEx, DHL, or others. The communication between the retailer's system 104 and the PRAE System 102 will be accomplished using an application programming interface (API) through which the retailer may expose their data. In alternative embodiments, the PRAE System may provide an API that the retailer's system may use to access the data housed in the PRAE System. In alterative embodiments, the communication between the retailer's system 104 and the PRAE System 102 will be accomplished using an alternate communication method known in the art. Also shown in FIG. 1, the customer interacts with the retailer's system 104 and the PRAE System 102 via a computer or mobile device 106 through a computer network (wired or wireless), such as the Internet. As shown in the embodiment in FIG. 1, all updates, notifications, or alerts intended for the customer will be sent by way of an update to the status of the return/exchange within the retailer's system 104 that is accessible via the customer's computer or mobile device 106. In some embodiments, the customer may enable "push notifications" or "text notifications" from the retailer's system 104 that would allow the retailer's system to send an alert or text message to the customer's computer or mobile device 106 or an alternative computer or mobile device as indicated by the customer. In alternative embodiments, the customer may receive updates, notifications, or alerts from the PRAE System 102 directly.

The PRAE System is housed in a server located on a cloud computing service provided by a third party. All data stored within the PRAE System is likewise stored in the cloud. In alternate embodiments, the PRAE System and all data stored within the PRAE System are located on a physical server. The PRAE System stores product return information such as, by way of example and not limitation, the information provided by the retailer system after a return has been initiated and the information collected from the driver during the product pickup/auditing/drop-off processes. The product return information will not be maintained and stored infinitely within the PRAE System to optimize both the functionality and the security of the PRAE System. The PRAE System will maintain and store the product return information at least until the product return process has been completed (i.e., when the PRAE System received confirmation that the product has been successfully delivered to the retailer's designated return address). The product return information will be periodically deleted from the PRAE System. The periodic deletion of the product return information may occur after a predetermined time has elapsed since the information was added to the system. In some embodiments, the PRAE System may also store and maintain information related to the retailer, the PRAE System authorized drivers, the shipping services, and other entities that interact with the PRAE System. The retailor information may include the name of the retailer, retailer contact information, certain preferences identified by the retailer related to the return and/or exchange process, etc. The PRAE System authorized driver information may include the name of the driver, driver contact information, certain preferences identified by the driver related to the return and/or exchange process, etc. The shipping service information may include the name of the shipping service, shipping service contact information, etc. In some embodiments, the retailer information, the PRAE System authorized driver information, the shipping information, and any other information related to other entities that interact with the PRAE System may be stored and maintained by the PRAE System indefinitely unless removed manually.

Figure 2:
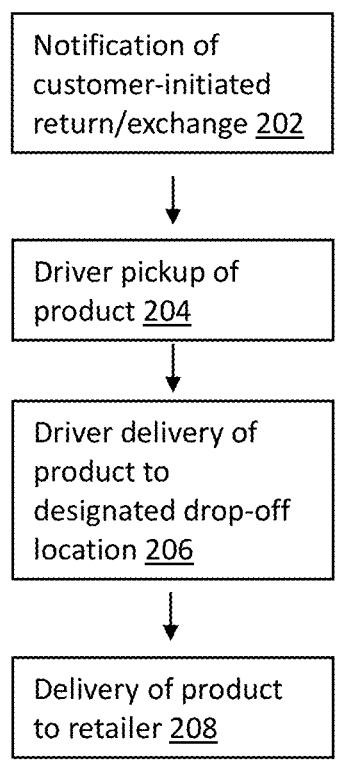
FIG. 2 is a flow chart illustrating aspects of further embodiments of the invention.

As shown in FIG. 2, when a customer initiates a return or exchange 202 through the retailer's system 104, the PRAE System 102 receives a notification 202 from the retailer 104 via a computer network that the consumer has initiated a return and provides the details and information related to the return and/or exchange. The retailer system 104 will provide, at a minimum, the location of the product in the form of a pickup address provided by the customer when the customer initiates a return. The pickup address can be the customer's home address or any other address identified by the customer. The retailer system 104 may also optionally provide the customer's name, the customer's email address, the pickup time window selected by the customer, delivery instructions provided by the customer (such as gate access code, apartment access information, package pickup location information, etc.), the dimensions of the product, the weight of the product, a description of the product, the return number the retailer associates with the purchase, the purchase number the retailer associates with the purchase, the product identification number the retailer associates with the purchase, etc. Some of this information may be received into and stored in a database associated with the PRAE System 102, such as when a PRAE System customer registers for the service. Alternatively, or in addition, the PRAE System 102 may communicate with a database associated with a retailer so that some or all of the above information about the product is associated with a particular SKU or product number, and such information is available to the PRAE System 102 when a customer identifies the product to be returned. Alternatively, or in addition, some or all of the above information may be entered into the PRAE System 102 at the point of or time of purchase of the product by the customer, either online for an e-commerce retailer, or in person at a retail location participating in the PRAE System 102. The information provided by the retailer can then be used to optimize the driver selection, product pickup, and quality auditing processes. In an alternative embodiment, when the customer initiates a return or exchange 202 through the retailer's system 104, the customer will be directed to the PRAE System 102 and the customer may communicate the relevant information directly to the PRAE System 102. This may occur, for example, if the customer has never used the PRAE System before.

After the PRAE System 102 has been notified that a return has been initiated, the PRAE System will present the pickup to available drivers within a predefined distance. The pool of available drivers may include either drivers that have been authorized and granted the ability to accept pickups directly from the PRAE System or drivers that are commissioned through a logistics partner. In the case of a logistics partner driver, the PRAE System 102 communicates via a computer network the details of the product return and/or exchange to the logistics partner's system 108, which then sends a driver to the customer's identified pickup location to pick up the product 204. The logistics partner will determine how drivers are assigned based on a number of factors, including the distance the driver is from the pickup location, the type and size of vehicle the driver drives, and how many packages the driver currently has. Once a driver has been assigned the pickup, the driver is associated with the return and/or exchange as the pickup agent for the product.

Figure 3:
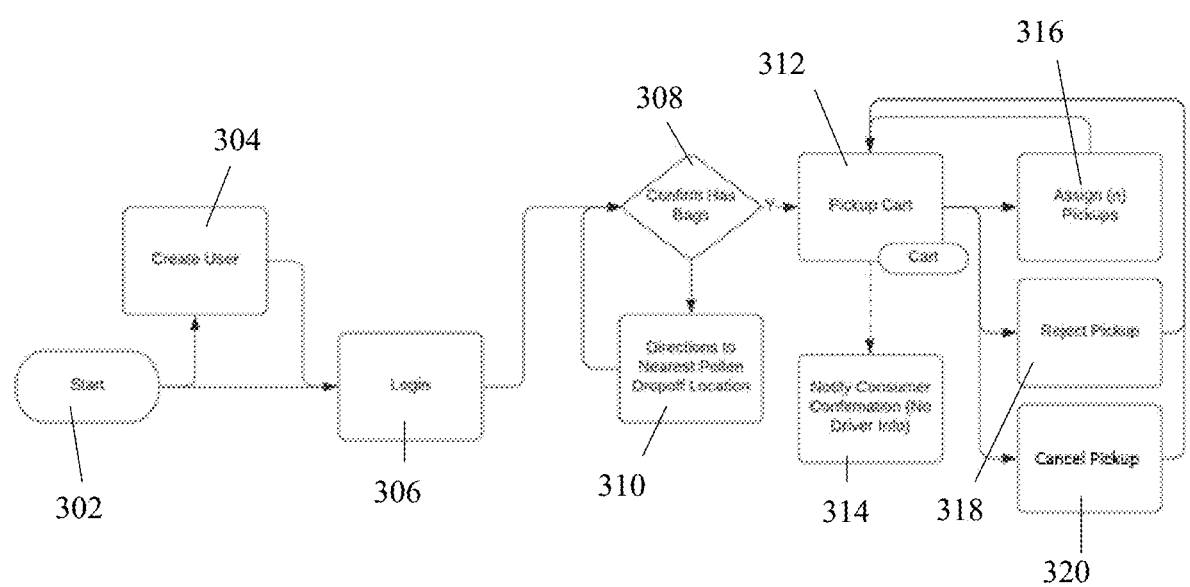
FIG. 3 is a flow chart showing the authorized PRAE System driver assignment process employed in an embodiment of the invention.

FIG. 3 shows the process by which an authorized PRAE System driver may use the PRAE System 102 to accept or decline a product pickup 302. When the driver accesses the system, the driver is prompted to create an account 304 or log into an existing account 306. The driver is then prompted to confirm that they have in their possession one or more of the designated return containers 308. The return containers are the containers in which the driver will put the item for return for shipping and tracking. By return containers, the inventors include all manner of containers or means of associating a tracking label to the product, including without limitation, bags, boxes, cartons, wraps, labels, stickers or envelopes. For purposes of illustration and not limitation, further examples will refer to "designated bags," but it is to be understood that any suitable return container may be used and the reference to "designated bags" is exemplary only and not intended to limit the scope of the invention. The designated bags will be labeled with a Quick Response ("QR") code that contains at least a universally unique identifier ("UUID"). In alternative embodiments, other means of encoding information may be used. If the driver indicates that he or she does not have the bags, he or she will be directed to the nearest designated drop-off location to obtain the designated bags 310. Once the driver confirms he or she has the designated bags, the driver is prompted to either accept one or more pickups 316, reject pickups 318, or cancel an accepted pickup at any time 320. The accepted pickup will also be canceled after a predetermined amount of time has passed without the driver completing the pickup. If the driver accepts a pickup 316, the PRAE System 102 sends a confirmation notification to the customer 314. The confirmation notification 314 does not include any identification information of the driver. If the driver rejects the pickup 218 or if an accepted pickup is canceled by the driver or the expiration of the predetermined time limit 320, the pickup will be put back out to be accepted by another driver. In some embodiments, if an accepted pickup is canceled by the driver or the expiration of the predetermined time limit 320, the PRAE System 102 sends a cancellation notification to the customer.

Figure 4:
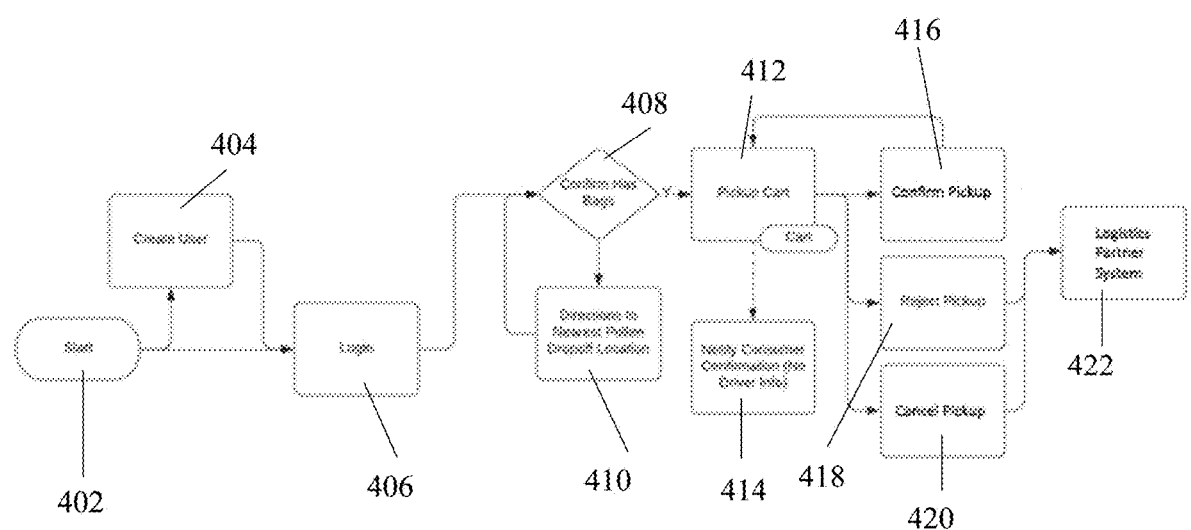
FIG. 4 is a flow chart showing the logistics partner driver assignment process employed in an embodiment of the invention.

FIG. 4 shows the process by which a logistics partner driver may use the PRAE System 102 to confirm a product pickup 402 that he or she has been assigned through the logistics partner system 108. When the driver accesses the system, the driver is prompted to create an account 404 or log into an existing account 406. In an alternate embodiment, the driver's PRAE System login credentials (which may be the same as the driver's login credentials to the logistics partner system 108) may be communicated by the logistics partner system 108 so as to obviate the need for the driver to enter, remember, and maintain a second set of login credentials. The driver is then prompted to confirm that he or she has in his or her possession one or more of the designated PRAE System bags 408. The designated bags will be labeled with a QR code that contains at least a universally unique identifier (UUID). If the driver indicates that they do not have the bags in their possession, they will be directed to the nearest designated drop-off location to obtain the designated bags 410. Once the driver confirms he or she has the designated bags, the driver is prompted to either confirm the assigned pickup(s) 416, reject the assigned pickup(s) 418, or cancel an assigned pickup at any time 420. The assigned pickup will also be canceled after a predetermined amount of time has passed without the driver completing the pickup. If the driver confirms a pickup 416, the PRAE System 102 sends a confirmation notification to the customer 414. The confirmation notification 414 does not include any identification information of the driver. If the driver rejects the pickup 418 or if an accepted pickup is canceled by the driver or the expiration of the predetermined time limit 420, the pickup will be put back out to be accepted by another driver and the driver will be directed back to the logistics partner system 108 to be assigned a new pickup 422. In some embodiments, if an accepted pickup is canceled by the driver or due to the expiration of the predetermined time limit 420, the PRAE System 102 sends a cancellation notification to the customer.

Figure 5:
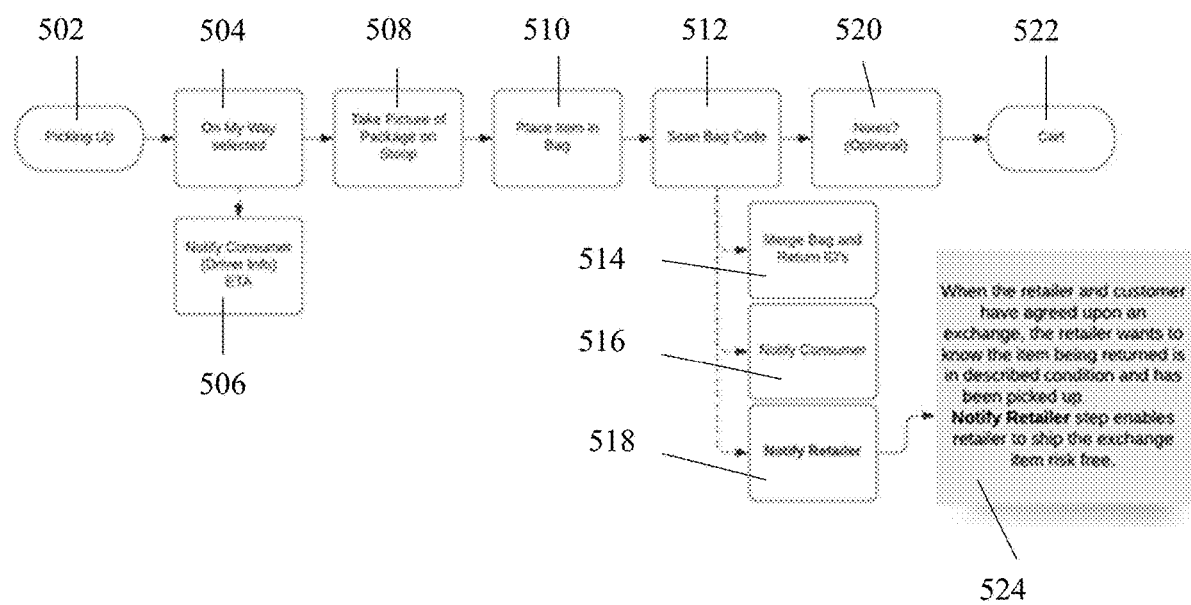
FIG. 5 is a flow chart showing the driver pickup process employed in an embodiment of the invention.

FIG. 5 shows the process by which a driver (either an authorized PRAE System driver or a logistics partner driver) may use the PRAE System 102 to navigate the pickup process 502. The driver will be provided certain information to facilitate the pickup process; this information includes, but is not limited to, the pickup address, directions to the pickup address, a description of the product, the size of the product, the weight of the product, information related to the pickup (for example, where the product will be located, gate access instructions, apartment access instructions, etc.). The driver will be prompted to indicate when he or she is on his or her way to the pickup location 504; this will trigger the system to send a notification to the consumer that a driver in on the way 506. In embodiments, as shown in FIG. 5, the customer is also notified of the driver information and the estimated pickup time 506. In some embodiments, the PRAE System 102 will provide directions to the pickup location.

Upon pickup of the package 204, the driver then is prompted to take a picture 508 (the "second return product data") of the product and place the product in a PRAE System-designated bag 510 to audit the condition of the product at the time the driver picks up the product. In alternative embodiments, instead of or in addition to the driver being prompted to take a picture 508, the driver is prompted to assign a rating (an alternative "second return product data") as to the condition of the product. By way of example and not limitation, the rating could be on a scale of one to five, wherein the product is in excellent condition at a score of 1 and is visibly damaged at a score of 5, or vice versa. Alternatively, or in addition, the audit may audit the identity (an alternative "second return product data") of the product in the bag, without checking on product condition, such as by comparing the actual product being picked up to the product information associated with the return. Alternatively, or in addition, the audit may check preselected criteria by the retailer, such as any visible damage to the product or product packaging, any unexpected odors, etc. The driver is then prompted to scan the QR code located on the PRAE System-designated bag using a mobile device 512 which triggers the system to send a notification to both the consumer and the retailer that the package has been picked up 516, 518. In some embodiments, the QR code is scanned using a QR code scanning module embedded in the PRAE System such that, after the driver scans the QR code when prompted, the UUID (the "first return product data") encoded in the QR code is then associated with the return within the PRAE System. In embodiments, other information may be embedded in the QR code, such as name and/or location information of the drop-off location where the QR code was affixed to the bag. In some embodiments, the QR code may be omitted from the bag entirely. The driver may optionally enter additional notes 520 relevant to the pickup, the return, the exchange, etc. (for example, as to the condition of the product/package). When the retailer and customer have agreed upon an exchange of the unwanted product, the retailer may initiate the exchange process 524 immediately after receiving the driver's confirmation that the product has been audited at pickup (by verifying the identity of the product and/or the condition of the product, as described above). In alternative embodiments, the retailer may instead wait to initiate the exchange process until after the product has been received at the designated drop-off location and undergone a second audit.

Figure 6:
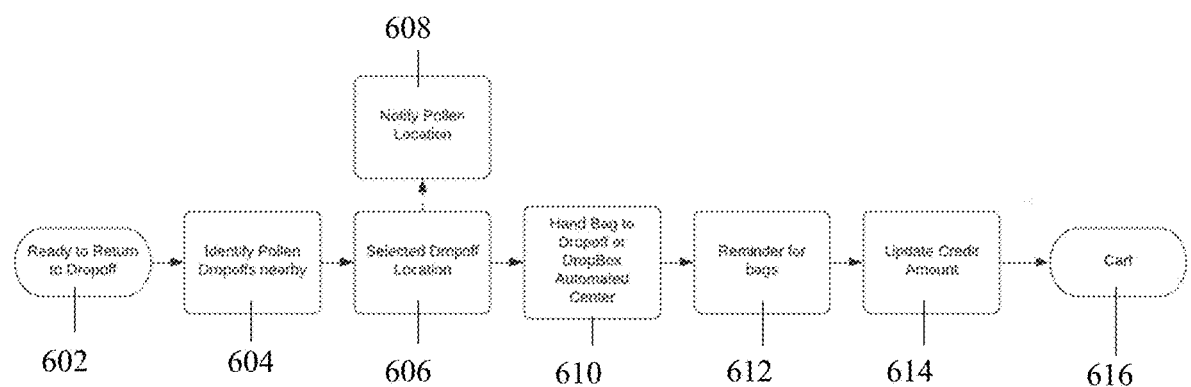
FIG. 6 is a flow chart showing the driver drop-off process employed in an embodiment of the invention.

After the driver has successfully picked up the product, the driver will then be prompted to deliver the product to a designated drop-off location 206. FIG. 6 shows the process by which a driver (either an authorized PRAE System driver or a logistics partner driver) may use the PRAE System 102 to navigate the drop-off process 602. The system will identify all designated drop-off locations nearby 604. The driver will be prompted to select a designated drop-off location 606, which will trigger the system to send a notification to the selected drop-off location that a delivery is on the way 608. In some embodiments, the system will pre-select the nearest drop-off location. The driver should then navigate to the selected drop-off location then hand the bag to the drop-off location attendants or leave the bag at an automated drop-off center 610. In some embodiments, the driver is not required to drop off the bag immediately; the driver may instead pick up a predetermined number of other packages or a certain amount of time has passed before proceeding to the drop-off location. By way of example and not limitation, the driver may pick up five total packages before proceeding to the drop-off location. By way of another example and not limitation, in the case of a logistics partner driver, the driver may perform other tasks (such as collecting and dropping off food orders, if such a service is offered by the logistics partner) until a certain amount of time has passed before proceeding to the drop-off location.

The drop-off location attendants will then scan the QR code (the "third return product data") on the PRAE System-designated bag and optionally perform a second audit as to the condition or identity of the product inside the bag. This second audit may ensure that the product is in the same condition as when the driver took a picture of product upon pickup. Alternatively, or in addition, the audit may check the identity of the product in the bag, without checking on product condition. Alternatively, or in addition, the audit may check preselected criteria by the retailer, such as any visible damage to the product or product packaging, any unexpected odors, etc. The driver will then be reminded to optionally collect additional bags 612 from the drop-off location. Upon successful drop-off of the bagged product at the designated drop-off location, the PRAE System will update the credit amount associated with the driver, or, in the case of a logistics partner driver, the PRAE System will send a notification to the logistics partner system 108 that the driver has completed the pickup and drop-off of the product.

Finally, as shown in FIG. 2, the PRAE System will coordinate the delivery of the unwanted product to the retailer or other location designated by retailer 208 (such as retailer's warehouse) from the drop-off location. The PRAE System will coordinate the delivery with a shipping service. In alternative embodiments, the PRAE System will coordinate the delivery with a logistics partner. In some embodiments, the PRAE System will notify the retailer's system 104 and/or the customer that the PRAE System has initiated final delivery with a shipping service (or logistics partner) to the retailer's designated delivery location. In some embodiments, the PRAE System will notify the retailer's system 104 and/or the customer that the PRAE System has received confirmation from the shipping service (or logistics partner) that the product has been delivered to the retailer's designated delivery location.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods, and uses, such as are within the scope of the appended claims. Those skilled in the art, having the benefit of the teachings of this specification, may affect numerous modifications thereto and changes may be made without departing from the scope and spirit of the invention in its aspects.

Any other undisclosed or incidental details of the construction or composition of the various elements of the disclosed embodiment of the present invention are not believed to be critical to the achievement of the advantages of the present invention, so long as the elements possess the attributes needed for them to perform as disclosed. Certainly, one skilled in the art would be able to conceive of a wide variety of alternatives and methods of use and successful combinations thereof. The selection of these and other details of construction are believed to be well within the ability of one of even rudimentary skills in this area, in view of the present disclosure. Illustrative embodiments of the present invention have been described in considerable detail for the purpose of disclosing a practical, operative structure whereby the invention may be practiced advantageously. The designs described herein are intended to be exemplary only. The novel characteristics of the invention may be incorporated in other structural forms without departing from the spirit and scope of the invention. The invention encompasses embodiments both comprising and consisting of the elements described with reference to the illustrative embodiments.

The invention claimed is:

1. A method for automatically processing the return or exchange of a product from a customer to a retailer, comprising:
   receiving a notification of a customer-initiated return of the product at a remote server of a third party;
   associating the notification with a return initiation info n anon about the product, the return information including at least a location of the product, provided by the customer, and a product information provided by a retailer of the product;
   electronically transmitting the return initiation information and a drop-off location to an available pickup agent;
   electronically transmitting instructions to the pickup agent to audit and identify the product being picked up;
   electronically receiving a first return product data, comprising data encoded on a return container of the pickup agent who picks up the product, and receiving a second return product data, comprising an image of the picked up product and successful auditing confirmation conducted by the pickup agent, from the same pickup agent after the pickup agent has possession of the product;
   electronically transmitting a communication after receiving the first return product data and the second return product data, the communication including at least the second return product data;
   electronically receiving and processing a third return product data after the pickup agent has delivered the return container containing the product to the drop-off location;
   electronically transmitting instructions to deliver the product from the drop-off location to a designated retailer location to complete the return, and transmitting instructions to the retailer, to process and issue a refund for the returned product after receiving the pickup agent's confirmation of successful auditing and identification of the picked up product, and prior to delivery to the drop-off location.

2. The method of claim 1, wherein the pickup agent is provided by a logistics partner.

3. The method of claim 1, wherein the first return product data comprises a UUID encoded in a QR code.

4. The method of claim 1, wherein the second return product data comprises a photograph of the product.

5. The method of claim 1, wherein the third return product data comprises a UUID encoded in a QR code.

6. The method of claim 1,
   wherein the pickup agent is selected from a prospective pool of drivers based on that driver's proximity to the location of the product, distance to the drop-off location, a type of vehicle used by the driver and other items that the driver is delivering.

7. The method of claim 1, further comprising the step of auditing a condition of the product by comparing the second return product data to one or more preselected criteria.

8. An automated system for facilitating the return and exchange of a product from a customer to a retailer, comprising:
   at least one computer processor that executes computer instructions that cause the system to:
   receive a notification of a customer-initiated return of a product at a remote server;
   associate the notification with a return initiation information about a product, the return information including at least a location of the product, provided by the customer, and a product information provided by a retailer of the product;
   electronically transmit the return initiation information and a drop-off location to an available pickup agent;
   electronically transmit instructions to the available pickup agent to audit and identify the product being picked up;
   electronically receive a first return product data encoded on a return container of the pickup agent who picks up the product, and a second return product data, comprising image of the picked up product and successful auditing confirmation conducted by the pickup agent, from the same pickup agent after the pickup agent has possession of the product;
   electronically transmit at least the second return product data to the retailer;
   electronically receive a third return product data after the pickup agent has delivered the return container containing the product to the drop-off location;
   electronically transmit instructions to deliver the product from the drop-off location to a designated retailer location to complete the return, and transmit instructions to retailer, to process and issue a refund for the returned product after receipt of the pickup agent's confirmation of successful auditing and identification of the picked up product, and prior to delivery to the drop-off location.

9. The system of claim 8, wherein the pickup agent is provided by a logistics partner.

10. The system of claim 8, wherein the first return product data comprises a UUID encoded in a QR code.

11. The method of claim 8, wherein the second return product data comprises a photograph of the product.

12. The method of claim 8, wherein the third return product data comprises a UUID encoded in a QR code.

13. The system of claim 10, wherein said computer processor is further configured to associate the first return product data with the return.

14. The system of claim 8, wherein the pickup information includes a location of the product.

15. The system of claim 1, wherein the pickup agent is selected from a prospective pool of drivers based on that driver's proximity to the location of the product, distance to the drop-off location, a type of vehicle used by the driver and other items that the driver is delivering.

16. The method of claim 8, wherein the computer processor is further configured to audit a condition of the product by comparing the second return product data to one or more preselected criteria.

17. The method of claim 1, further comprising:
receiving and processing an input data from the pickup agent, wherein the data confirms, declines, or cancels the pickup of the product; and
automatically reassigning the pickup to a different pickup agent in the event of declining or cancellation of the pickup.

18. The system of claim 8, wherein the processor executes further computer instructions that cause the system to:
receive and process the input data from the pickup agent, wherein the data confirms, declines, or cancels the pickup;
automatically reassign the pickup to a different driver in the event of declining or cancellation of the pickup.

* * * * *